(12) United States Patent
Sartori

(10) Patent No.: US 8,858,220 B2
(45) Date of Patent: Oct. 14, 2014

(54) LOCKING DEVICE FOR COLUMNS OF MOULDING PRESSES

(75) Inventor: Alessandro Sartori, Mazzano (IT)

(73) Assignee: Italtech SpA, Mazzano (BS) (IT)

( * ) Notice: Subject to any disclaimer, the term of this patent is extended or adjusted under 35 U.S.C. 154(b) by 0 days.

(21) Appl. No.: 13/877,375

(22) PCT Filed: Oct. 6, 2011

(86) PCT No.: PCT/IB2011/054401
§ 371 (c)(1),
(2), (4) Date: May 30, 2013

(87) PCT Pub. No.: WO2012/076999
PCT Pub. Date: Jun. 14, 2012

(65) Prior Publication Data
US 2013/0243902 A1    Sep. 19, 2013

(30) Foreign Application Priority Data

Oct. 18, 2010  (IT) .............................. PD2010A0312

(51) Int. Cl.
*B29C 45/64*  (2006.01)
*B29C 45/67*  (2006.01)

(52) U.S. Cl.
CPC ........... *B29C 45/641* (2013.01); *B29C 45/6707* (2013.01)
USPC .......................... 425/595; 425/451.9; 425/590

(58) Field of Classification Search
CPC ................................................. B29C 45/6728
USPC .............................. 425/451.2, 451.9, 590, 595
See application file for complete search history.

(56) References Cited

U.S. PATENT DOCUMENTS

| 2,862,238 A * | 12/1958 | Cuzzi ........................ 425/451.2 |
| 3,120,039 A * | 2/1964 | Stubbe et al. ................. 425/590 |
| 3,729,283 A * | 4/1973 | Eggenberger et al. ........ 425/595 |
| 6,733,275 B2 * | 5/2004 | Fujita ............................ 425/595 |
| 7,993,129 B2 * | 8/2011 | Chiang ......................... 425/595 |
| 2002/0127296 A1 | 9/2002 | Fujita |
| 2010/0173039 A1 | 7/2010 | Chiang |

FOREIGN PATENT DOCUMENTS

| DE | 200 06 618 | * | 9/2000 |
| EP | 1238777 | | 9/2002 |
| EP | 2163370 | | 3/2010 |
| JP | 11129303 | | 5/1999 |
| JP | 2003311796 | | 11/2003 |

* cited by examiner

*Primary Examiner* — James Mackey
(74) *Attorney, Agent, or Firm* — Themis Law

(57) ABSTRACT

A locking device for columns of presses with two pairs of locking clamps, wherein the locking clamps of one or both the pairs are mechanically connected to each other through at least one mechanism suited to guide in a synchronized way the relative translational motion of the two locking clamps of the same pair, and wherein the guide mechanism is integral with the moving plane in at least one fixed point, thus guaranteeing the symmetry of the motion of the locking clamps with respect to the fixed point.

5 Claims, 5 Drawing Sheets

LOCKING DEVICE FOR COLUMNS OF MOULDING PRESSES

FIELD OF THE INVENTION

The present invention concerns locking devices for axially loaded bars or columns, and in particular it concerns a new locking device, particularly for bars or columns of molding presses with injection of plastic materials. The molding presses of the known type comprise a fixed plane and a moving plane suited to be opposed to each other and pressed against a mold interposed between the planes, wherein the injection of the plastic material for the molding process takes place between said fixed plane and said moving plane.

Said moving plane can translate with respect to said fixed plane, approaching it or moving away from it, sliding on a sliding plane, and its motion is guided by one or more bars or columns rigidly constrained to said fixed plane and/or by other devices.

During the plastic injection and molding operation, said moving plane must be kept pressed against the mold positioned between said fixed plane and said moving plane, exerting a pressure sufficient to oppose the pressure exerted in the mould.

For this purpose, said moving plane is locked and constrained to columns through locking devices fitted on each column, each one of said locking devices being integral with said moving plane and suited to clamp the column, preventing any translation of the moving plane and exerting a compression force on the mould.

BACKGROUND OF THE INVENTION

Locking devices for the columns of presses are known, said locking devices comprising locking clamps mounted on said moving plane and engaged in said columns.

Said locking devices comprise two pairs of said locking clamps, the clamps of each pair being aligned on the horizontal or vertical plane and engaged in corresponding columns, and at least one pair of connection rods for each pair of said clamps.

Each clamp of a pair is connected to the clamp of the other pair that is in a corresponding position by means of at least one of said connection rods. In particular, each pair of clamps comprises a so-called inner clamp, meaning that it faces the other pair, and an outer clamp, meaning that it faces outwards.

The inner clamp of a pair is connected with the external clamp of the other pair through at least one of said rods.

Said locking device also comprises an actuator included between said two pairs of clamps, said actuator acting on both said inner clamps of said two pairs in order to open and close the two pairs of clamps at the same time. After closing the mould, translating said moving plane towards said fixed plane means making said actuator close the clamps that thus clamp said columns.

Once the clamps are closed, the columns are placed under traction by loading them axially in order to exert a compression force on the mould. Said actuator generally comprises a cylinder hinged to two arms, each arm being respectively hinged to one of said inner clamps, wherein the translational motion of the cylinder rod is transmitted to said clamps by means of said arms.

Therefore, each one of said locking elements has a fixed point with respect to said moving plane, wherein said fixed point is located between the inner clamps, at the level of a connection mechanism that connects the two inner clamps.

Said clamps of each pair, on the other hand, are not directly connected to each other, being simply constrained so that they slide on the same plane via guides which are integral with said moving plane.

Therefore, the synchronization of the clamps of each pair is carried out by said mechanism and by said rods that transmit motion from the inner clamp of one pair to the outer clamp of the other pair, while between the two clamps of the same pair there is no direct mechanical connection.

SUMMARY OF THE INVENTION

The subject of the present invention is a new type of locking device, in particular for the columns of injection molding presses.

The main object of the new locking device is to optimize the stress exerted on the clamps.

Another object of the present invention is to guarantee an optimal synchronization of the movements of the clamps, during both the opening and the closing step.

These and other direct and complementary objects are achieved by the new locking device for the columns of injection molding presses, said device being suited to be fitted on a pair of columns of the press and constrained to the moving plane.

The new device is particularly suited to be used with plastic injection presses of the type with horizontal columns.

In particular, the new locking device is particularly suited to be used with columns that are at least partially threaded or toothed, that is, columns that comprise, at least on the external cylindrical surface in which said locking device is engaged, adjacent projections or threads or teeth.

The new locking device comprises at least two pairs of locking clamps, each pair being suited to be engaged in one column.

Said clamps comprise an inner cylindrical surface provided with teeth or threads suited to be coupled with those provided on the column.

The two pair of clamps are aligned on the horizontal or vertical plane and each one of them is engaged in one column.

Each pair of clamps comprises a so-called inner clamp, meaning that it faces the other pair, and an outer clamp, meaning that it faces outwards.

Said pairs of clamps are mechanically connected to each other by means of a pair of connection rods, wherein the inner clamp of a pair is connected to the outer clamp of the other pair through at least one of said rods.

Said locking device also comprises an actuator or cylinder included between said two pairs of clamps and acting on both said inner clamps of said two pairs.

Said cylinder is suited to transmit to said clamps a translational motion crosswise to the direction of said columns, in order to close said clamps on the respective column or to open them.

Said columns are translated and loaded axially by a piston which is integral with the column or by other devices.

Once the mold has been closed, said moving plane is translated towards said fixed plane and thus the columns are translated to a position that makes it possible to couple the teeth of the columns with those of the clamps, and said actuator closes the clamps that clamp said columns.

Once the clamps have been closed, the pistons are placed under pressure and thus the teeth of the clamps come in contact and are coupled with those of the columns, loading the latter axially in order to exert a compression force on the mould.

Said clamps of each pair, furthermore, are directly and mechanically connected to each other through at least one guide mechanism, said mechanism comprising a carriage constrained so that it travels on guides which are integral with said moving plane of the mould, said carriage being located beside said clamps and equidistant from them, substantially aligned with the column.

Said carriage, in particular, is suited to translate in both senses along the direction transversal to the direction of movement of said clamps, that is, substantially parallel to said column.

Said carriage, furthermore, is hinged to at least one pair of connection arms, each one of said arms being in turn hinged to the inner clamp or the outer clamp of one pair.

Said connection mechanism of the clamps of each pair thus guides the opening/closing translational motion of said clamps, thus guaranteeing the perfect symmetry of the motion of said clamps with respect to a fixed point coinciding with said guides of the carriage, which are integral with the moving plane and therefore fixed with respect to it.

Said clamps of each pair, opening or closing with respect to said columns, thus perform a perfectly synchronized movement and, through said connection rods, also the two pairs of clamps are synchronized with each other.

The optimization of the forces is connected to the fact that during the opening and closing movements the weight of the clamps that move downwards is balanced by the clamps that move upwards thanks to the motion synchronization mechanism.

BRIEF DESCRIPTION OF THE DRAWINGS

The characteristics of the invention will be highlighted in greater detail in the following description, with reference to the drawings attached as non-limiting examples.

DETAILED DESCRIPTION OF EMBODIMENTS OF THE INVENTION

A device (1) according to the invention can be applied to molding presses (P), for example of the known type for the injection of plastic materials, comprising a fixed plane (Pf) and a moving plane (Pm) suited to be opposed and pressed against a mold interposed between the same planes (Pf, Pm), wherein the injection of plastic materials for the molding process takes place between said planes (Pf, Pm).

Said moving plane (Pm) can translate with respect to said fixed plane (Pf), sliding on a sliding plane (Ps), and its motion is guided by at least one pair of horizontal columns (A) rigidly constrained to said fixed plane (Pf) and/or by other devices.

In particular, the new locking device (1) is suited to be used with columns (A) that comprise adjacent projections or threads or teeth (A2), at least on the external cylindrical surface (A1) in which said locking devices (1) are engaged.

Figure 1:
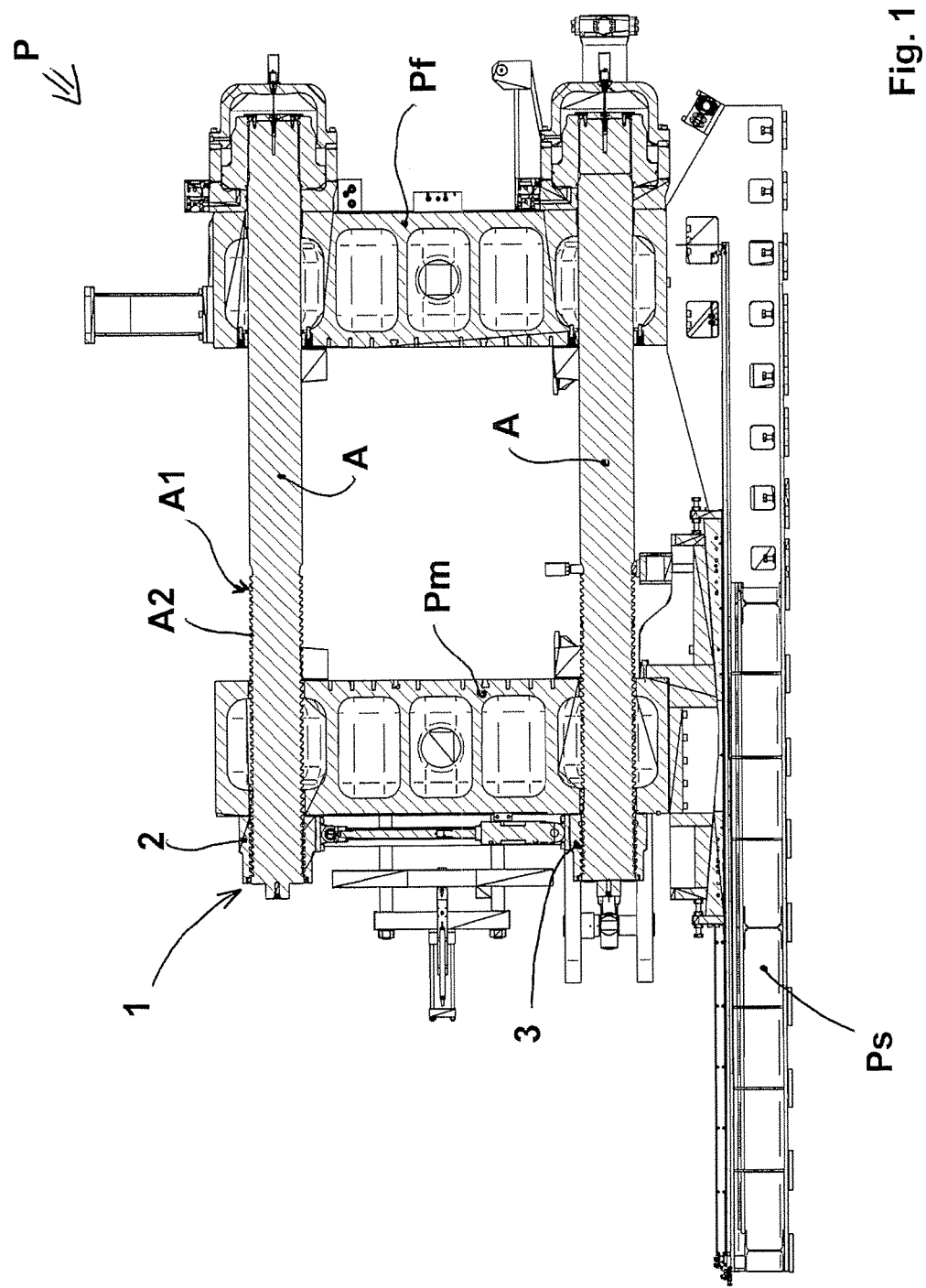
FIG. 1 schematically shows a side view of the clamping unit of an injection molding press (P) with horizontal columns (A) and locking devices (1) engaged in said columns (A).
Figure 2:
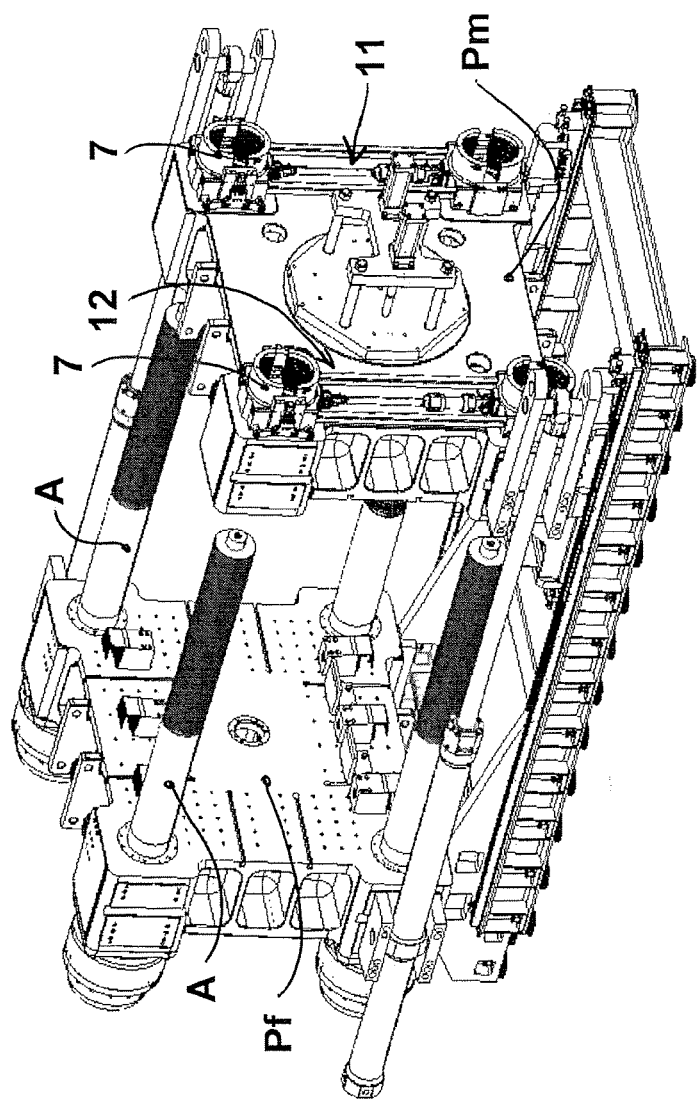
FIG. 2 schematically shows a three-dimensional view of the press (P) with four horizontal columns (A) and two locking devices (11, 12), each engaged in one pair of columns (A).
Figure 3:
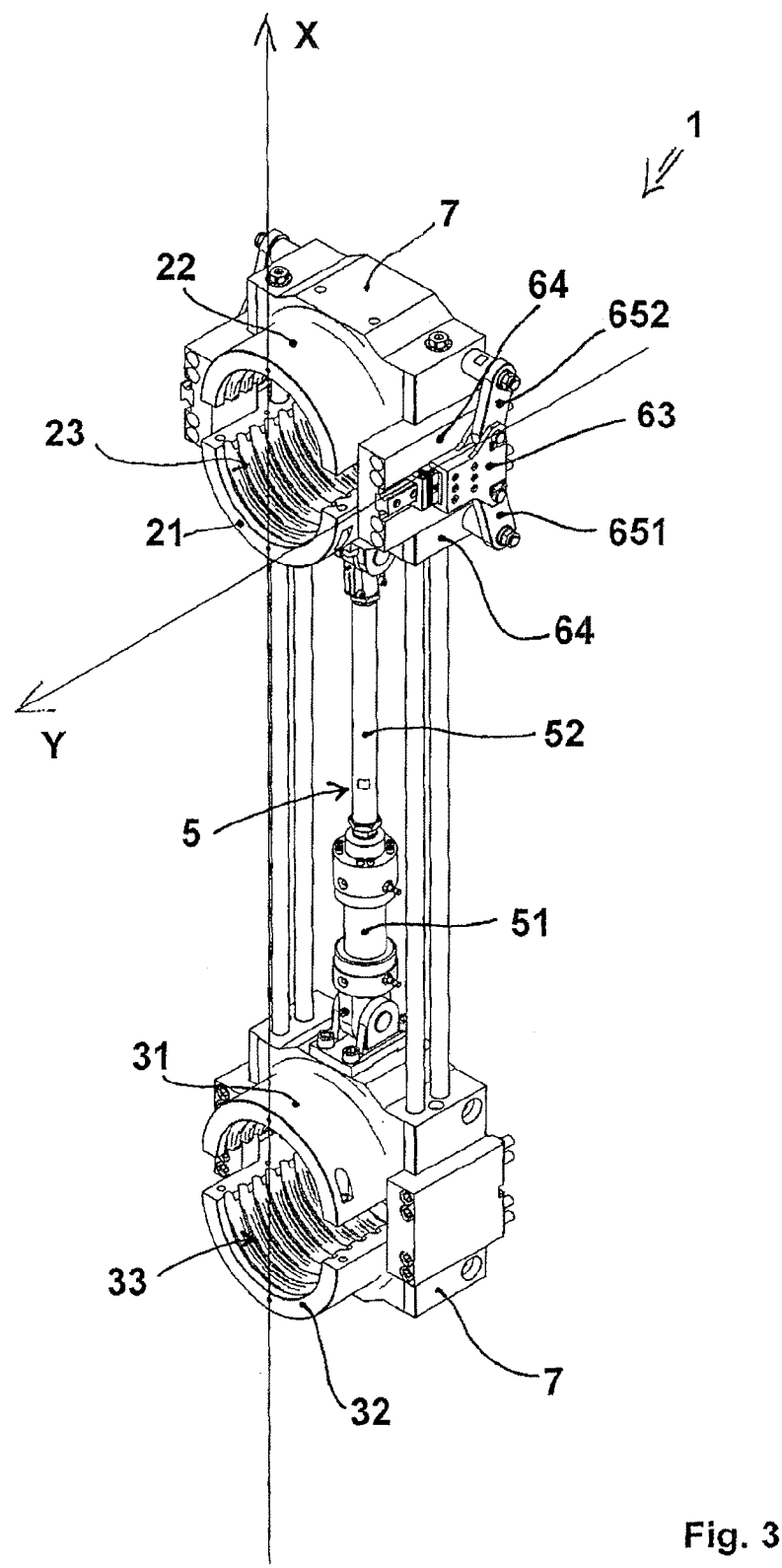
FIG. 3 shows a three-dimensional view of the new locking device (1).
Figure 4:
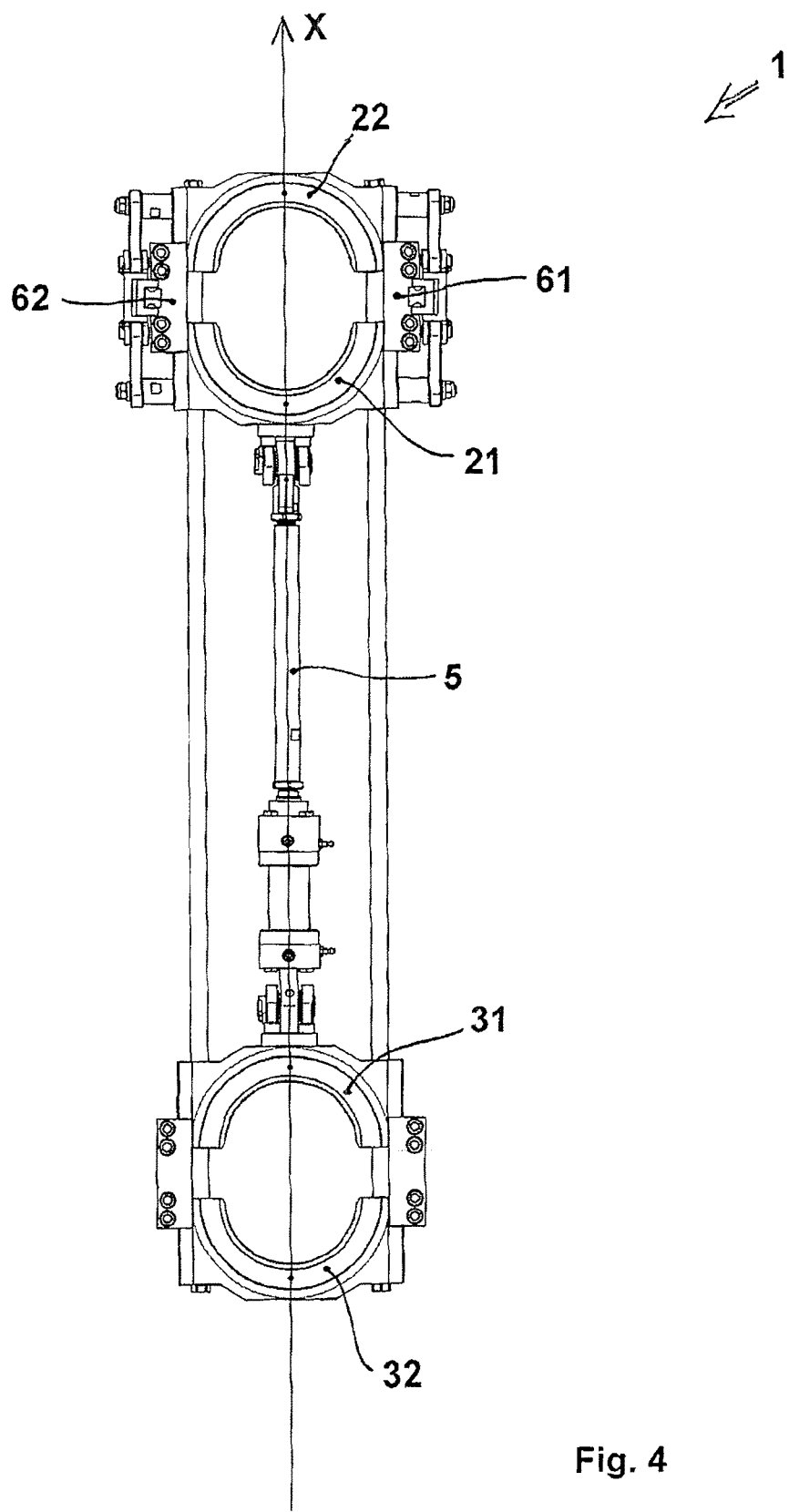
FIG. 4 shows a front view of the new locking device (1).
Figure 5:
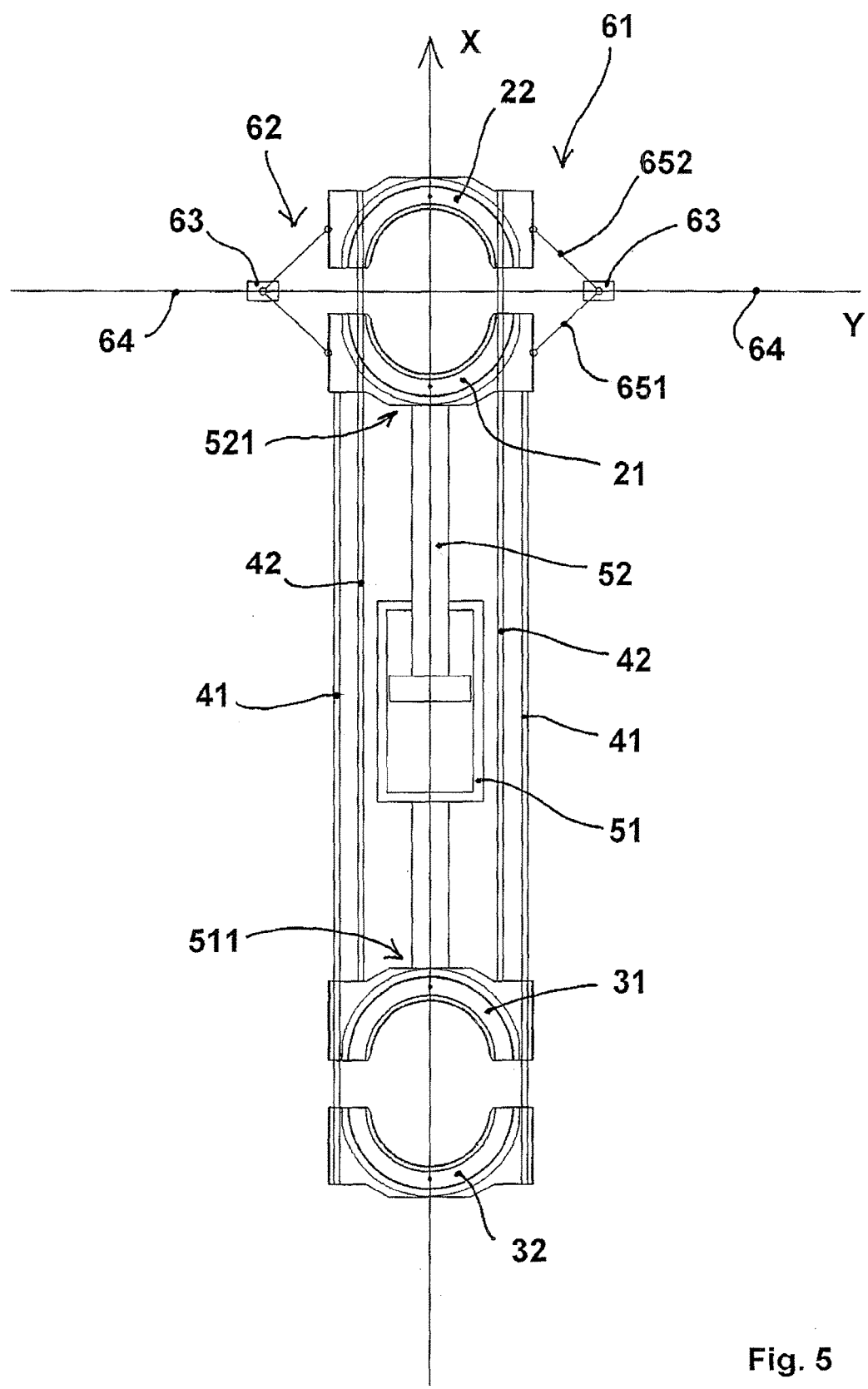
FIG. 5 shows a diagram exemplifying the operation of the new locking device (1).

As shown in FIG. 2, said press (P) comprises in particular four horizontal columns (A).

The press (P) of FIG. 2 is provided with two of said locking devices (11, 12), each one engaged in one pair of columns (A) that are aligned vertically.

Each locking device (1) comprises two pairs (2, 3) of locking clamps (21, 22, 31, 32), wherein each pair (2, 3) of clamps is engaged in a corresponding column (A).

The clamps (21, 22, 31, 32) of each pair (2, 3) are free to translate in a direction (X) orthogonal to the corresponding column (A), being constrained to a support (7) that is integral with the moving plane (Pm) of the press (P).

The two pairs (2, 3) of clamps of each locking element (1) are thus aligned, in this case, on the vertical plane and each of them is engaged in a corresponding column (A).

Said clamps (21, 22, 31, 32) are internally threaded, that is, they comprise, on at least part of their inner surface (23, 33), adjacent grooves or threads or teeth suited to mesh with the threads or teeth or projections (A2) of the corresponding column (A).

Each pair (2, 3) of clamps comprises an inner clamp (21, 31), that is, a clamp facing the other pair (3, 2) of clamps, and an outer clamp (22, 32) opposing said inner clamp (21, 31).

Said inner clamp (21, 31) of each pair (2, 3) is mechanically and directly connected to the outer clamp (32, 22) of the other pair (3, 2) through at least one connection rod or bar (41, 42), said connection rod being preferably linear in shape and rigid and suited to rigidly transmit motion between the two connected clamps (21, 32) or (31, 22), so that their motion is equal and synchronized.

Between said two pairs (2, 3) of clamps there is at least one actuator (5) acting on both said inner clamps (21, 31) of said two pairs (2, 3) and suited to cause said inner clamps (21, 31) to translate in said direction (X) orthogonal to the column (A) and in both senses.

Said actuator (5) is preferably a piston comprising a cylinder (51) and a rod (52), wherein said cylinder (51) is hinged (511) to one of said inner clamps (31) and said rod (52) is hinged (521) to the inner clamp (21) of the other pair (2).

The extension and retraction of said actuator (5) cause the corresponding translational motion of both said inner clamps (21, 31) in relation to said columns (A).

Said translational motion of said inner clamps (21, 31) of each pair (2, 3) is correspondingly transmitted to the corresponding outer clamps (32, 22) of the other pair (3, 2) via said connection rods (41, 42).

Each pair (2, 3) of clamps opens and closes at the same time, clamping the corresponding column (A) or releasing it.

In order to guarantee the precise coupling between said threads or teeth (A2) of the column and said threads or teeth (23, 33) of the clamps (21, 22, 31, 32), the invention envisages the use of sensors suited to detect the position of said locking devices (1) with respect to said columns (A).

According to the invention, in fact, said columns (A) of the press (P) can move in the axial direction in order to allow the precise positioning of the teeth (A2).

Said clamps (21, 22, 31, 32) of at least one pair (2 or 3) are mechanically and directly connected to each other via at least one or preferably one pair of mechanisms (61, 62) suited to guide the translational motion of said clamps (21, 22, 31, 32) of the same pair (2, 3).

Said guide mechanisms (61, 62) are constrained to said moving plane (Pm) of the press (P) and are placed beside the opposite sides of said pair of clamps (2 or 3), in an intermediate position between the two clamps (21, 22, 31, 32), substantially aligned with the corresponding column (A).

Each one of said guide mechanisms (61, 62) comprises a carriage (63) suited to translate in both senses along a direction (Y) transversal to the direction (X) of movement of said clamps (21, 21, 31, 32), preferably parallel to said column (A).

Said carriage (63), in particular, is constrained so that it translates on guides (64) that are integral with said support (7) of the pair (2, 3) of clamps, that is, integral with said moving plane (Pm) of the press (P).

Said carriage (63) is also hinged to one pair of connection arms (651, 652), each of said arms being in turn hinged to the inner clamp (21, 31) or the outer clamp (22, 32) of the corresponding pair (2, 3).

Said connection mechanisms (61, 62) of the clamps of at least one pair (2, 3) thus guide the relative translational motion opening and closing said clamps (21, 22, 31, 32), guaranteeing the perfect symmetry of motion of said clamps with respect to the fixed point coinciding with said guides (64) of the carriages (63).

Therefore, with reference to the above description and the attached drawings, the following claims are expressed.

The invention claimed is:

1. A locking device (1) for columns (A) of presses (P) with at least one fixed plane (Pf) and at least one moving plane (Pm), wherein said locking device (1) comprises:
    two pairs (2, 3) of locking clamps (21, 22, 31, 32) aligned in a first direction (X) orthogonal to a plurality of columns (A), each pair (2, 3) being engaged to a corresponding column (A) and being configured to clamp said column, said locking clamps (21, 22, 31, 32) being configured to translate in said first direction (X), wherein each pair (2, 3) of locking clamps comprises an inner clamp (21, 31), facing toward the other pair of locking clamps (3, 2), and an outer clamp (22, 32) opposing said inner clamp (21, 31);
    at least one connection rod or bar (41, 42) configured to rigidly transmit a translational motion between said inner clamp (21, 31) of each pair (2, 3) and the outer clamp (32, 22) of the other pair (3, 2); and
    at least one actuator (5) located between said two pairs (2, 3) of locking clamps and acting on both of said inner clamps (21, 31) of said two pairs (2, 3) and configured to cause said inner clamps (21, 31) to translate in said first direction (X) orthogonal to the plurality of columns (A) and in an opposite sense,
    wherein said locking clamps (21, 22, 31, 32) of one or both of said two pairs (2, 3) are mechanically connected to each other through at least one mechanism (61, 62) suited to guide in a synchronized way the a relative translational motion of said locking clamps (21, 22, 31, 32) of a same pair (2, 3),
    wherein said guide mechanism (61, 62) is integral with said moving plane (Pm) in at least one fixed point (64), thus guaranteeing the a symmetry of the motion of said clamps (21, 22, 31, 32) with respect to said fixed point (64), and
    wherein said guide mechanism (61, 62) comprises:
    a carriage (63) configured to translate in both senses along a second direction (Y) transversal to the first direction (X) of movement of said locking clamps (21, 21, 31, 32);
    guides (64) on which said carriage (63) slides, said guides (64) being integral with said moving plane (Pm) of a press (P); and
    one pair of connection arms (651, 652) hinged to said carriage (63) and each in turn hinged to the inner clamp (21, 31) or the outer clamp (22, 32) of the corresponding pair (2, 3),
    wherein said translational motion of said clamps (21, 22, 31, 32) of the same pair (2, 3) is symmetrical with respect to said guides.

2. The locking device according to claim 1, wherein said carriage (63) is suited to translate, in both senses, along said second direction (Y) parallel to said plurality of columns (A).

3. The locking device according to claim 1, further comprising, for at least one of said pairs (2, 3) of locking clamps, at least one pair of said guide mechanisms (61, 62) positioned on the opposite sides of said corresponding pair of clamps (2, 3), and substantially aligned with a corresponding column (A).

4. The locking device according to claim 1, wherein said actuator (5) is a piston comprising a cylinder (51) and a rod (52), wherein said cylinder (51) is hinged (511) to one of said inner clamps (31) and said rod (52) is hinged (521) to the inner clamp (21) of the other pair (2), and wherein an extension and a retraction of said actuator (5) cause a corresponding translational motion of both of said inner clamps (21, 31) in relation to said plurality of columns (A), said corresponding translational motion of said inner clamps (21, 31) of each pair (2, 3) being correspondingly transmitted to corresponding outer clamps (32, 22) of the other pair (3, 2) through said at least one connection rod or bar (41, 42).

5. The locking device according to claim 1, wherein said carriage (63) has a lower surface engaging a rail extending upwardly from a base connecting said guides (64).

* * * * *